US009630542B2

(12) United States Patent
Kwon

(10) Patent No.: US 9,630,542 B2
(45) Date of Patent: Apr. 25, 2017

(54) MAT FIXING CLIP FOR VEHICLE CARPET

(71) Applicant: DAEHAN SOLUTION CO., LTD, Incheon (KR)

(72) Inventor: Choong Ho Kwon, Seoul (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 0 days.

(21) Appl. No.: 14/891,468

(22) PCT Filed: Oct. 29, 2014

(86) PCT No.: PCT/KR2014/010230
§ 371 (c)(1),
(2) Date: Nov. 16, 2015

(87) PCT Pub. No.: WO2015/072680
PCT Pub. Date: May 21, 2015

(65) Prior Publication Data
US 2016/0082871 A1 Mar. 24, 2016

(30) Foreign Application Priority Data
Nov. 14, 2013 (KR) .................. 10-2013-0138092

(51) Int. Cl.
*B60N 3/04* (2006.01)
*F16B 2/22* (2006.01)
(Continued)

(52) U.S. Cl.
CPC .............. *B60N 3/046* (2013.01); *F16B 2/22* (2013.01); *F16B 5/065* (2013.01); *F16B 5/123* (2013.01)

(58) Field of Classification Search
CPC . B60N 3/046; F16B 2/22; F16B 5/065; F16B 5/123
See application file for complete search history.

(56) References Cited

U.S. PATENT DOCUMENTS

D569,240 S *  5/2008  Aoki ............................. D8/382
7,540,066 B2 *  6/2009  Aoki ..................... B60N 3/046
                                                                  16/4

(Continued)

FOREIGN PATENT DOCUMENTS

JP    2013-111277 A    6/2013
JP    2000-153731 A    7/2013
(Continued)

OTHER PUBLICATIONS

International Search Report for PCT/KR2014/010230 mailed Feb. 17, 2015.

*Primary Examiner* — Jeffrey O Brien
(74) *Attorney, Agent, or Firm* — Bacon & Thomas, PLLC

(57) ABSTRACT

A mat fixing clip of a vehicle carpet that is configured to fix the clip to the carpet by one fastener and then to fix the fixed fastener in advance while being covered by another fastener, and doubly couples and fixes the clip to the carpet using these fasteners, thereby easily and quickly mounting the clip to the carpet to improve assembling characteristics, and fixes the clip twice to prevent the clip once mounted from being detached from the carpet and improve the coupling force. In particular, a mat fixing clip of a vehicle carpet that enables the two fasteners to fix the carpet in opposite directions, thereby being able to complement the coupling strength at the coupling site and further enhance the coupling strength.

6 Claims, 3 Drawing Sheets

(51) Int. Cl.
*F16B 5/06* (2006.01)
*F16B 5/12* (2006.01)

(56) References Cited

U.S. PATENT DOCUMENTS

| | | | | |
|---|---|---|---|---|
| 8,402,605 B2* | 3/2013 | Courtin | ............... | B60N 3/046 16/4 |
| 8,495,791 B2* | 7/2013 | Yoon | ............... | B60N 3/046 16/13 |
| 8,701,265 B1* | 4/2014 | James | ............... | B64C 1/20 24/297 |
| 8,757,698 B1* | 6/2014 | Rowland | ............... | B60N 3/044 296/97.23 |
| 8,882,171 B2* | 11/2014 | Goto | ............... | B60N 3/046 16/4 |
| 8,931,162 B2* | 1/2015 | Gonzalez | ............... | B60N 3/042 16/4 |
| 9,016,756 B2* | 4/2015 | Goto | ............... | B60N 3/046 16/4 |
| 2014/0373314 A1* | 12/2014 | Machida | ............... | B60N 3/046 24/351 |
| 2016/0096463 A1* | 4/2016 | Kwon | ............... | B60N 3/046 24/455 |
| 2016/0121773 A1* | 5/2016 | Kwon | ............... | B60N 3/046 248/205.1 |

FOREIGN PATENT DOCUMENTS

| | | |
|---|---|---|
| KR | 10-0949359 B1 | 3/2010 |
| KR | 10-2010-0061173 A | 6/2010 |
| KR | 10-0971253 B1 | 7/2010 |
| KR | 10-1210463 B1 | 12/2012 |

* cited by examiner

MAT FIXING CLIP FOR VEHICLE CARPET

FIELD OF THE INVENTION

The present invention relates to clip for fixing a mat of carpet of a vehicle, and more particularly, to a clip that can be doubly fixed to the carpet, while quickly and easily mounting the clip to the carpet, by forming two fasteners assembled to the clip in a one-touch manner, and strengthens the coupling force of the clip to prevent the clip from being detached from the carpet.

BACKGROUND

In general, when mats are used by being additionally mounted on carpets in a vehicle, clips for fixing the mats are fixedly installed on the carpet, and the mats are fixed by being hooked to the clips. Patent Documents 1 and 2 disclose configurations of clips used to fix mats on carpets in this way.

Patent Document 1 relates to a clip for fixing a mat on a carpet of a vehicle, and discloses the clip that includes a lower plate that is located on a lower surface of the carpet and has insertion grooves formed in a front section; an upper plate that is located on an upper surface of the carpet and has hooks to be fastened to the insertion grooves formed in a front section thereof and a protrusion to which the mat is fitted formed in a upper part thereof; a column that passes through a hole of the carpet and vertically connects a rear section of the lower plate and a rear section of the upper plate; and a pressing unit that is formed by a flexible material to enhance a fixing force of the clip to the carpet by pressing the carpet section fitted between the upper plate and the lower plate upward when the upper plate and the lower plate are fastened, has an annular longitudinal sectional surface, and by which the upper part and the lower part gradually come closer to each other when the upper plate and the lower plate are fastened.

Patent Document 2 relates to a vehicle carpet reinforcing structure which reinforces a vehicle carpet to be fixed with a mat using a fixing clip, and a method of manufacturing the same. The vehicle carpet reinforcing structure includes a body that is located to correspond to a lower part of the fixing clip and has a plate shape body; and a fixing unit installed on one side of the body to fix the body to the carpet. According to the vehicle carpet reinforcing structure and method of manufacturing the same of Patent Document 2, by reinforcing the carpet to correspond to a bottom surface of the fixing clip for fixing the mat, it is possible to suppress the damage or deformation of the carpet due to the movement of the fixing clip and to extend the lifetime of the carpet.

However, such conventional clips have the following problems:

(1) Since the upper plate and the lower plate are formed to be divided, it was inconvenient to mount the clip to the carpet.

(2) Since the clip is fixed to the carpet in the form of an elastic piece, when a weak impact is applied to the clip, the elastic piece is easily unfixed, and the clip may be detached from the carpet;

(3) The mat fixed to the clip deviates from its original position due to the detachment of the clip, and there is an inconvenience in that the mat is required to be fixed at its original position again or repositioned;

(4) When the clip is frequently unhooked or does not work due to damage or the like, since there is a need to replace the clip with a new one, there is an inconvenience in maintenance;

(5) In particular, since the fixing unit of the clip made in the form of the elastic piece loses elasticity over time, ultimately, the clip may be detached from the carpet; and (6) Since the elastic piece has a form in which it is hooked on only one side, when loads are applied to the clip from several directions, the clip is easily unhooked, and the clip may be detached from the carpet.

Patent Document 1 Korean Patent No. 10-0971253 (registration date: Jul. 13, 2010)

Patent Document 2 Korean Patent No. 10-1210463 (registration date: Dec. 4, 2012)

SUMMARY OF THE INVENTION

The present invention is directed to provide a mat fixing clip of a vehicle carpet that is configured to fix the clip to the carpet by one fastener and then to fix the fixed fastener in advance while covering the fastener by another fastener, and doubly couples and fixes the clips to the carpet using these fasteners, thereby easily and quickly mounting the clip to the carpet to improve assemblability, and fixes the clip twice to prevent the once mounted clip from being detached from the carpet and improve the coupling force.

In particular, the present invention is directed to provide a mat fixing clip of a vehicle carpet that enables the two fasteners to fix the carpet in opposite directions, thereby being able to complement the coupling strength at the coupling site and further enhance the coupling strength.

Moreover, the present invention is directed to provide a mat fixing clip of a vehicle carpet that allows the two fasteners to be mounted on the carpet in a one-touch manner, thereby easily and quickly mounting the clip, and allows the clip to be easily detached when it is needed to remove the clip.

One aspect of the present invention provides a mat fixing clip of a vehicle carpet which includes a body 100 which has a hook 110 formed on one side of the body to hook a mat M a first fastener 200 that is formed in two mounting holes H1 and H2 formed in a carpet C to fix the carpet C, a second fastener 300 that is formed between the mounting holes H1 and H2 in a form which covers the first fastener 200 to fix the carpet C, and a plurality of pressing protrusions 120 formed to contact the carpet C, wherein each of the first fastener 200 and the second fastener 300 comprises supports 210 and 310 formed at the body 100 to protrude outward through any one mounting hole; hooking jaws 220 and 320 formed in the body 100 to protrude outward through the other mounting hole; and pressing plates 230 and 330 that are rotatably formed in the supports 210 and 310 and are hooked at front ends by the hooking jaws 220 and 320 to press the carpet C.

In particular, the pressing plate 230 may further have an elastic deformation protrusion 234 on a surface that faces the carpet C.

In addition, the respective pressing plates 230 and 330 may be formed to be rotatable by being connected to the supports 210 and 310 by weakened sections 231 and 331. Each of the pressing plate 230 and 330 may be installed on the supports 210 and 310 to rotate in opposite directions to each other.

The pressing plate 230 and 330 may be installed to contact each other and hooking protrusions 232 and 332 may be formed in the surfaces contacting each other to be fixed by being hooked to each other.

Finally, insertion grooves 233 and 333 may be formed at tips of the pressing plate 230 and 330 to be coupled to the hooking jaws 220 and 320 in a one-touch manner.

According to the mat fixing clip of the vehicle carpet of present invention, there are following effects.

(1) Since the clip is doubly mounted and fixed to the carpet using two fasteners, it is possible to strengthen the binding force of the clip and prevent the clip from being easily detached from the carpet.

(2) In particular, by setting the different positions at which the two fasteners are coupled to each other, even if an external force is applied to the clip, there is an effect of dispersing the external force to the two fasteners, and it is possible to enhance the effect of preventing the clip from being detached from the carpet.

(3) Since the two fasteners are coupled in a one-touch manner to fix the clip to the carpet, the clip can be easily mounted on the carpet and can be easily detached.

(4) By forming the elastic deformation protrusion on the fastener that is in direct contact with the carpet, when fixing the clip to the carpet by the fastener, the elastic deformation protrusions enhances the mounting force of the clip while being deformed between the carpet and the fastener to prevent the detachment of the clip.

(5) Since the two fasteners are connected to each other using the hooking jaws to perform the hooking operation on the surface by which the two fasteners contact each other, it is possible to further enhance the coupling force between the clip and the carpet as well as between the fasteners.

(6) Since the two fasteners are integrally manufactured, the manufacturing process can be reduced and the mass-production is possible.

DETAILED DESCRIPTION OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Therefore, since the exemplary embodiments described herein and the configuration illustrated in drawings are merely the most preferred embodiment of the present invention and are not intended to limit all the technical ideas of the present invention, it should be understood that there may be variations equivalents or modifications capable of replacing them at the time of filing this application.

(Configuration)

As illustrated in FIGS. 1 to 4, a mat fixing clip of a vehicle carpet according to the present invention is configured to include a body 100. A hook to which the mat M can be hooked is formed on one side of the body, and a first fastener 200 and a second fastener 300 for doubly fixing the carpet C are formed at the other side.

In particular, the first fastener 200 and the second fastener 300 are configured to rotate in opposite directions to each other to mount the clip to the carpet C, thereby enhancing the mounting force of the clip and allowing the attachment and detachment in a one-touch manner to easily and quickly perform assembling and disassembling.

Hereinafter, each component according to the present invention will be specifically described. Here, the carpet C is produced by being mounted in a vehicle by a conventional technique, and two mounting holes H1 and H2 are formed therein to mount the clip used to fit and fix the mat M. Moreover, the mat M mounted on the carpet C is also produced by a conventional technique.

Figure 1:
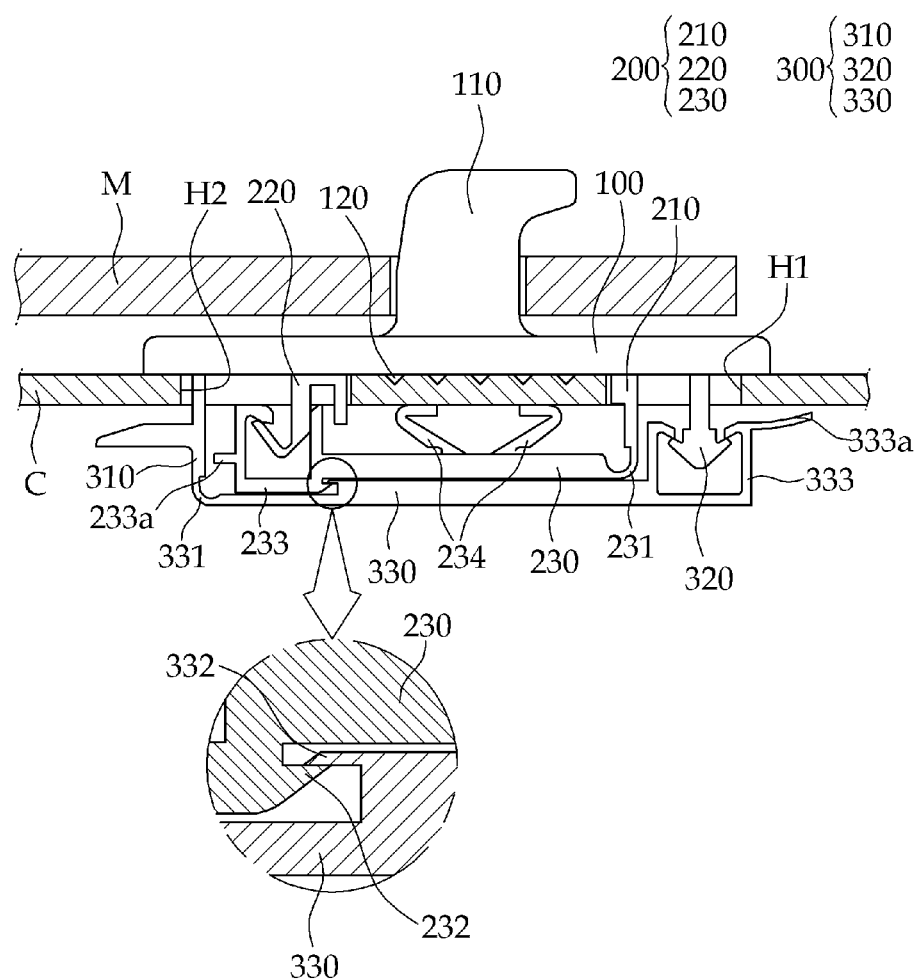
FIG. 1 is a cross-sectional view illustrating a state in which a clip is mounted on a carpet and then a mat is fitted thereon to describe a configuration of a clip according to the present invention.
Figure 2:
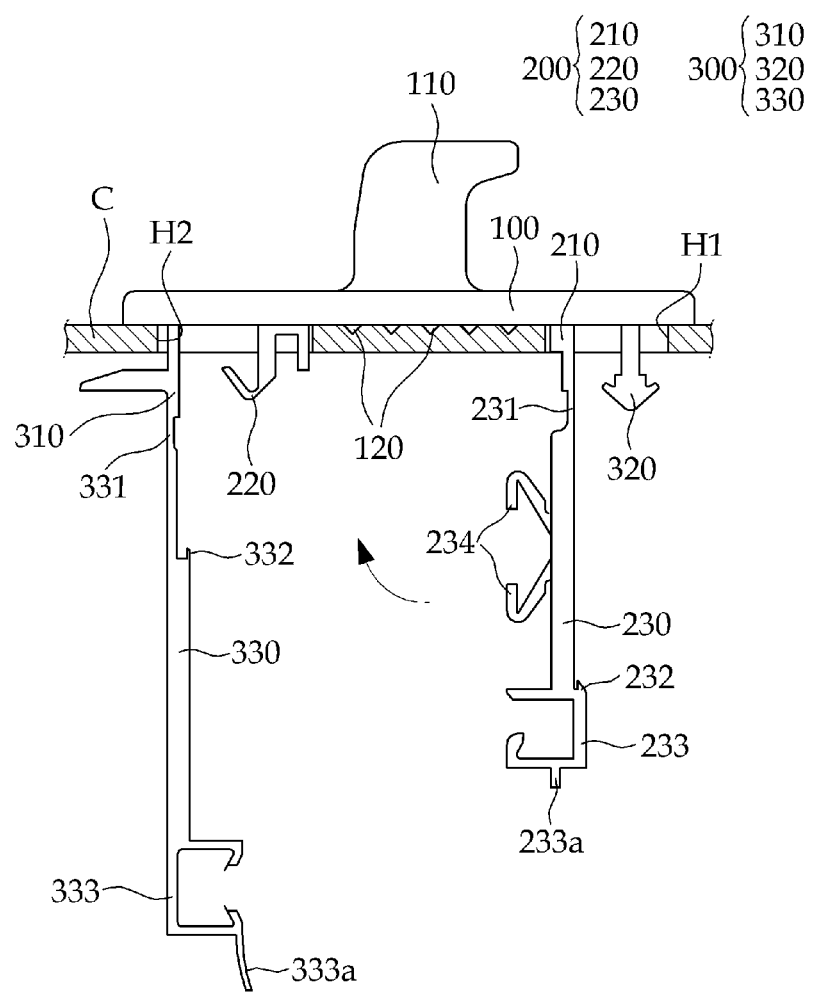
FIG. 2 is a cross-sectional view illustrating a state in which the clip according to the present invention is inserted into a mounting hole to mount the clip to a carpet.

As illustrated in FIGS. 1 and 2, the body 100 is manufactured in a plate form having a predetermined size, and a hook 110 is formed on one side. The hook 110 is intended to hook and fix the mat M mounted on the carpet C.

Further, a plurality of pressing protrusions 120 are formed on the other side of the body 100. The pressing protrusions 120 are in contact with the carpet C as the body 100 is placed over the carpet C, and are fitted to the carpet C in the form of a wedge as the clip according to the present invention is mounted, and have a function of enhancing the mounting force of the clip.

On the side formed with the pressing protrusions 120, the first fastener 200 and the second fastener 300 are configured.

As illustrated in FIGS. 1 and 2, the first fastener 200 is configured to include a support 210 and a hooking jaw 220 formed to protrude outward through the two mounting holes H1 and H2 formed to mount the clip on the carpet C, and a pressing plate 230 that is formed in the support 210 to be rotatable and is press-fitted to the hooking jaw 220 to press the carpet C.

FIG. 2 illustrates a state in which the support 210 protrudes from the right mounting hole H1 and the hooking jaw 220 protrudes from the other mounting hole H2. Moreover, although the support 210 and the hooking jaw 220 may be formed as separate components and mounted to the body 100, they may be preferably formed integrally with the body 100.

As illustrated in FIG. 2, the pressing plate 230 is formed in the support 210 to be rotatable. At this time, the pressing plate 230 may be manufactured separately from the support 210, or may be manufactured integrally with the support 210. When it is manufactured integrally with the support 210, the pressing plate is formed to be easily rotatable toward the hooking jaw 220 around a weakened section formed as the weakened section 231.

Also, an insertion groove 233 is formed at the tip of the pressing plate 230 to have a shape that covers the hooking jaw 220, and when pressing the insertion groove 233 while contacting the hooking jaw 220, it can be coupled in a one-touch manner, and thus, the first fastener 200 can be easily mounted. In the drawings, reference numeral "233a" which is not described is a handle formed on the insertion groove 233. When pressing the handle, the insertion groove 233 is easily detached from the hooking jaw 220 in a one-touch manner while the insertion groove 233 is deformed.

In a preferred embodiment of the present invention, it is preferable to further form an elastic deformation protrusion 234 on a surface of the pressing plate 230 that faces the carpet C. The elastic deformation protrusion 234 causes deformation in the carpet C and the pressing plate 230 as the pressing plate 230 rotates and the insertion groove 233 is fitted to the hooking jaw 220, thereby elastically supporting the first fastener 200 to be firmly fixed therebetween without play.

As illustrated in FIGS. 1 and 2, the second fastener 300 is formed by a support 310, a hooking jaw 320 and a pressing plate 330. Since such a configuration is substantially the same as the first fastener 200 described above, only the differences are described below, and the detailed description of the similarities will be omitted. In the drawings, in the same configuration, in the case of the second fastener 300, the first digit of the three-digits is represented by "3".

The support 310 and the hooking jaw 320 are formed in the two mounting holes H1 and H2, similarly to the first fastener 200. Therefore, there is a risk that the first fastener 200 and the second fastener 300 may overlap. Therefore, by forming the configuration in which the second fastener 300 covers the first fastener 200, the first fastener 200 and the second fastener 300 are configured so that they do not overlap each other and do not interfere with each other.

That is, the distance between the support 210 and the hooking jaw 220 of the first fastener 200 is disposed to be located slightly longer than a minimum distance between the two mounting holes H1 and H2, and the distance between the support 310 and the hooking jaw 320 of the second fastener 300 is formed to be slightly longer than this distance. Thus, the pressing plate 330 of the second fastener 300 is has a form which covers the pressing plate 230 of the first fastener 200. Therefore, an elastic deformation protrusion 234 is not formed in the pressing plate 330 unlike the first fastener 200.

In a preferred embodiment of the invention, although the pressing plate 330 of the second fastener 300 may be configured to rotate in the same direction as the pressing plate 230 of the first fastener 200, they are preferably formed to rotate in opposite directions to each other. The reason is that sections formed integrally with the weakened sections 231 and 331 are distributed to both sides, and the coupling method of the one-touch manner using the hooking jaws 220 and 320 are distributed to both sides, and the left and right sides are symmetrical to each other in a double fixing structure, and the load is distributed to minimize the detachment of the clip.

Also, in a preferred embodiment of the present invention, as illustrated in FIGS. 1 and 2, it is preferred that each of the hooking protrusions 232 and 332 is formed in the pressing plates 230 and 330 to overlap each other, and as the second fastener 300 is mounted after mounting the first fastener 200, the hooking protrusions 232 and 332 are hooked to each other to enhance the coupling force between the first fastener 200 and the second fastener 300.

(Assembly)

Figure 3:
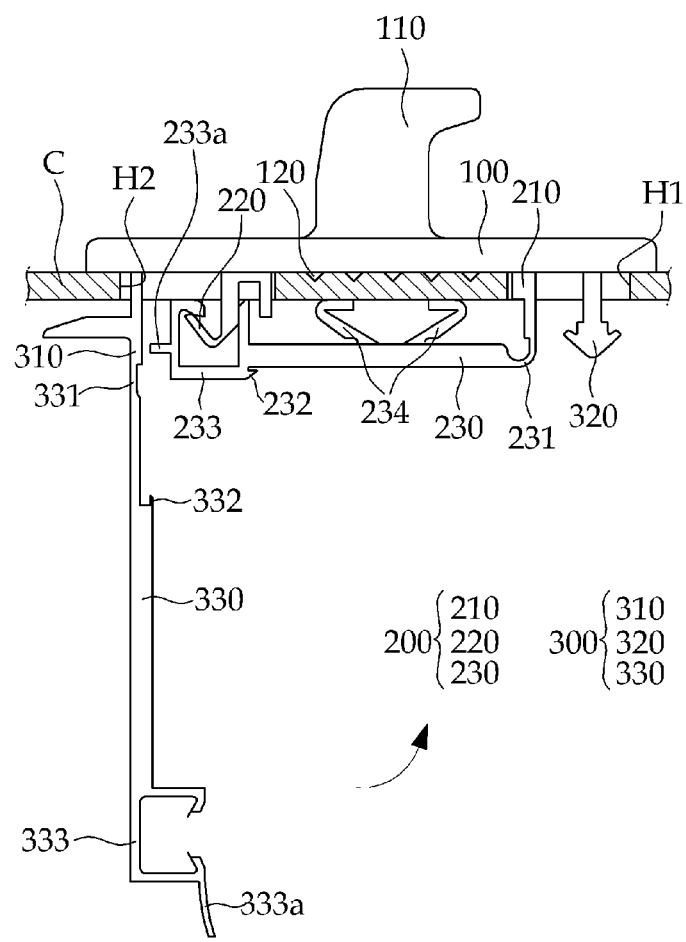
FIG. 3 is a cross-sectional view illustrating a state in which a tongue section is fitted and fixed to a fixing section while the clip according to the present invention is fitted to the mounting hole.
Figure 4:
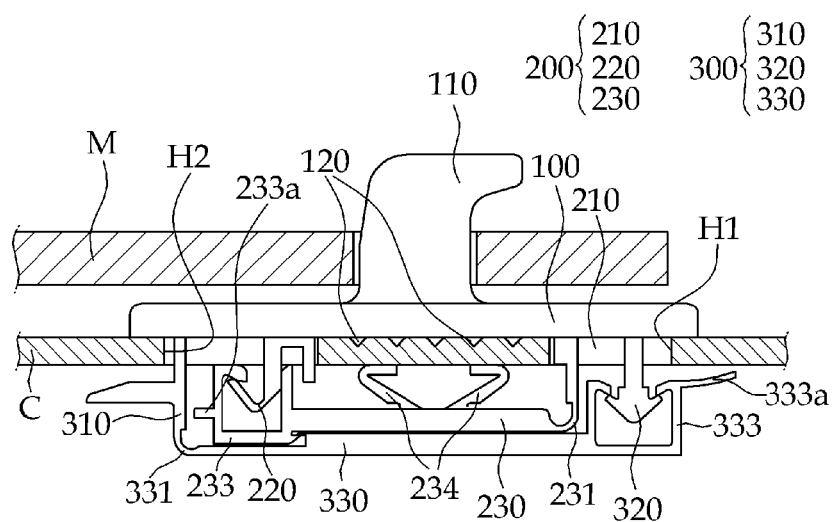
FIG. 4 is a cross-sectional view illustrating a state in which the clip according to the present invention is mounted on the carpet and the mat is mounted on the clip.

As illustrated in FIGS. 2 to 4, the clip according to the present invention is assembled to the carpet C, and then, the mat M is covered thereon and the clip is fixed to the hook 110. The procedure is as follows.

First, as illustrated in FIG. 2, the clip according to the present invention is fitted to the carpet C so that each of the supports 210 and 310 is fitted to the mounting holes H1 and H2.

Next, as illustrated in FIG. 2, the pressing plate 230 is rotated in a clockwise direction, and after the insertion groove 233 is fitted to the hooking jaw 220, it is strongly pushed and press-fitted as illustrated in FIG. 3. At this time, the pressing plate 230 presses the carpet C while pressing and deforming the elastic deformation protrusion 234, and thus, the pressing protrusion 120 is also pressed and is stuck to the carpet C like a wedge.

Next, as illustrated in FIG. 3, the pressing plate 330 rotates in a counterclockwise direction, the insertion groove 333 is fitted to the hooking jaw 320, and then, it is forcibly pressed and press-fitted as illustrated in FIG. 4. At this time, the locking protrusions 232 and 332 formed between the pressing plates 230 and 330 are hooked to each other, and the assembly of the clip is finished.

Finally, as illustrated in FIG. 4, the finishing work is performed by hooking the mat M overlying the carpet C to the hook 110.

Meanwhile, when the clip according to the present invention is separated as needed, the clip is detached from the hooking jaws 220 and 320 while the insertion grooves 233 and 333 are deformed by grasping and pulling the handles 233a and 333a outward, and the hooking operation is released.

As described above, according to the present invention, by allowing the clip to have the double locking functions using the two fasteners, it is possible to prevent the clip from being detached from the carpet. Moreover, the two fasteners prevent the clip from being easily detached from the carpet, by allowing the coupling in the opposite directions to each other and by allowing the load applied to the clip to be distributed to both sides.

Also, since the present invention allows the two fasteners to be attached and detached in a one-touch manner, it is possible to easily and quickly perform the mounting and disassembling tasks of the clip.

The invention claimed is:

1. A mat fixing clip of a vehicle carpet, wherein the vehicle carpet comprises a first mounting hole and second mounting hole;

the clip comprises:
a body which has a hook formed on an upper side of the body for hooking a mat;
a first fastener extending from a lower side of the body, the first fastener having a first support extending through the first mounting hole, a first hooking jaw extending through the second mounting hole, and a first pressing plate rotatably formed at a first end on the first support and having a first insertion groove on a second end for hooking with the first hooking jaw to press the carpet;
a second fastener extending from a lower side of the body, the second fastener having a second support extending through the second mounting hole, a second hooking jaw extending through the first mounting hole, and a second pressing plate rotatably formed at a first end on the second support and having a second insertion groove on a second end for hooking with the second hooking jaw;
wherein the first support and the first hooking jaw are formed between the second support and the second hooking jaw, such that when the first insertion groove is hooked with the first hooking jaw and the second insertion groove is hooked with the second hooking jaw, the second pressing plate covers the first pressing plate to prevent the fixing clip from becoming easily detached from the carpet.

2. The mat fixing clip of the vehicle carpet of claim 1, wherein the first pressing plate further comprises an elastic deformation protrusion on a surface that faces the carpet.

3. The mat fixing clip of the vehicle carpet of claim 1, wherein the first pressing plate is rotatably connected to the first support by a first living hinge and the second pressing plate is rotatably connected to the second support by a second living hinge.

4. The mat fixing clip of the vehicle carpet of claim 1, wherein the first pressing plate has a first hooking protrusion and the second pressing plate has a second hooking protrusion, wherein when the first insertion groove is hooked with the first hooking jaw and the second insertion groove is hooked with the second hooking jaw, the first pressing plate contacts the second hooking plate and the first hooking protrusion and the second hooking protrusion are hooked together to prevent the fixing clip from becoming easily detached from the carpet.

5. The mat fixing clip of the vehicle carpet of claim 1, wherein the first and second insertion grooves allow the first and second pressing plates to be coupled to the first and second hooking jaws, respectively, in a one-touch manner.

6. The mat fixing clip of the vehicle carpet of claim 1, comprising a plurality of pressing protrusions extending from the lower side of the body to contact the carpet.

* * * * *